April 27, 1926.
M. NEIGHBAUER
FOOD COVER
Filed August 29, 1922
1,582,296
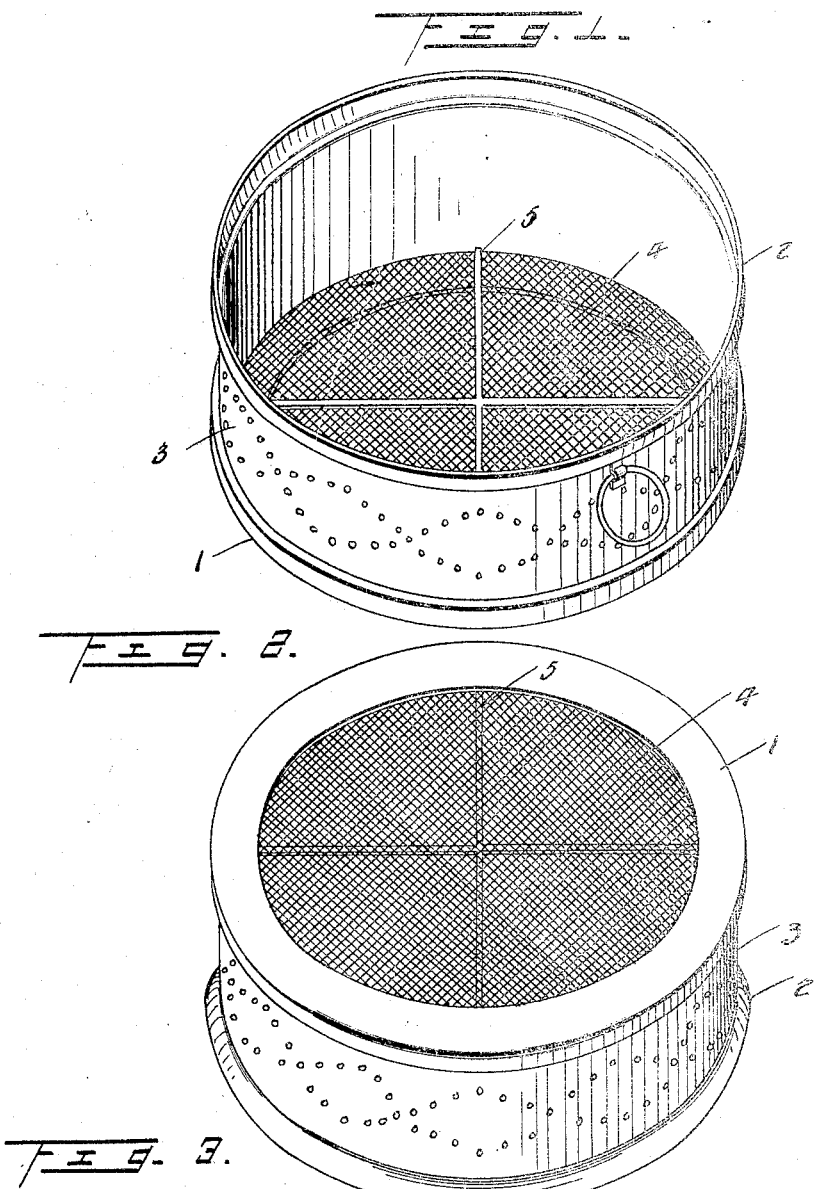
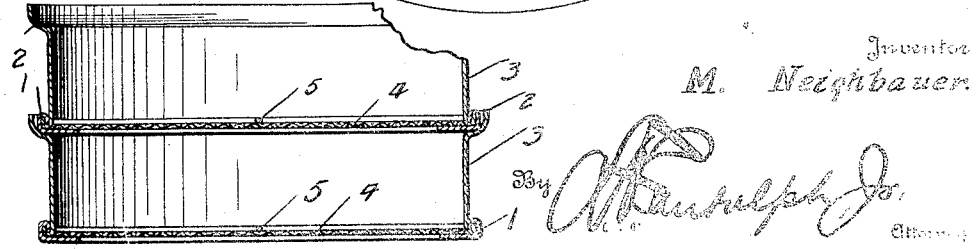

Patented Apr. 27, 1926.

1,582,296

UNITED STATES PATENT OFFICE.

MARY NEIGHBAUER, OF CARRIZOZO, NEW MEXICO.

FOOD COVER.

Application filed August 29, 1922. Serial No. 584,976.

*To all whom it may concern:*

Be it known that I, MARY NEIGHBAUER, a citizen of the United States, residing at Carrizozo, in the county of Lincoln and State of New Mexico, have invented certain new and useful Improvements in Food Covers; and I do hereby declare the following to be a full, clear, and exact description of the invention, such as will enable others skilled in the art to which it appertains to make and use the same.

The primary intent of the present invention is the provision of a food protector for covering dishes containing food, whereby to prevent insects and animals from reaching the same.

This invention furthermore provides an article which may be used for other purposes, such as a sieve, a strainer, a steam cooker and a handy utensil for a variety of purposes.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of a food cover embodying the invention as seen from the top side, Figure 2 is a similar view of the device inverted, and Figure 3 is a sectional view showing a number of covers placed one upon the other.

Corresponding and like parts are referred to in the following description and designated in the several views of the drawings by like reference characters.

The numeral 1 designates a hoop or band, preferably of sheet metal. The upper edge of the hoop or band 1 is flared, as indicated at 2, to receive the lower edge of a cover when placed thereon, whereby to hold a number of covers in superposed position without liability of displacement, as indicated in Figure 3. A suspending ring 3 is applied to a side of the hoop or band 1 and the latter is perforated in its sides for ventilation. A screen 4 constitutes the bottom and may be attached to the lower edge of the hoop or band 1 in any preferred way. A crossed brace 5 stiffens and reinforces the screen bottom 4 and may be attached to the hoop or band 1 in any substantial and preferred way.

When the device is used as a cover, it may be placed over a dish containing food and may rest upon the dish or may extend over the latter and rest upon the table or other supporting surface upon which the dish may be placed. The screen bottom enables the device to be used in the capacity of sifter or screen, whereby liquids may be drained from articles of food when preparing the same. When used as a steam cooker, one device may be placed upon the other in the order indicated in Figure 3, or in reverse order, the flared edge portion 2 of one engaging the adjacent edge of the next in order, whereby to prevent lateral displacement and hold the articles in superposed position. When space is limited, the covers may be placed one upon the other each supporting an article of food to be protected. This is indicated most clearly in Figure 3.

What is claimed is:

An article of the class described comprising a rim, a screen, the rim at one edge having a bead securing said screen in place and extending outwardly of the main outer wall of the rim, and said bead having a flat extension disposed over and in contact with the screen and projecting inwardly beyond the inner surface of the rim a considerable distance to support the article when inverted in covering relation on a receptacle, to thereby relieve the screen of strain incidental to the last mentioned use.

In testimony whereof I affix my signature.

MARY NEIGHBAUER.